US009337460B2

(12) United States Patent
Tsuruta et al.

(10) Patent No.: US 9,337,460 B2
(45) Date of Patent: May 10, 2016

(54) BATTERY MODULE (71) Applicant: GS Yuasa International Ltd., Kyoto-shi (JP)

(72) Inventors: Shogo Tsuruta, Kyoto (JP); Masamitsu Tononishi, Kyoto (JP); Ryutaro Nishikawa, Kyoto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 71 days.

(21) Appl. No.: 14/244,813

(22) Filed: Apr. 3, 2014

(65) Prior Publication Data

US 2014/0302356 A1 Oct. 9, 2014

(30) Foreign Application Priority Data

Apr. 8, 2013 (JP) ................. 2013-080631

(51) Int. Cl.
*H01M 10/04* (2006.01)
*H01M 2/30* (2006.01)
*H01M 2/12* (2006.01)
*H01M 2/10* (2006.01)

(52) U.S. Cl.
CPC .......... *H01M 2/1252* (2013.01); *H01M 2/1077* (2013.01); *H01M 10/0413* (2013.01); *H01M 10/0468* (2013.01)

(58) Field of Classification Search
CPC ..................... H01M 10/0413; H01M 10/0468; H01M 2/1077; H01M 2/1252; H01M 2/30
See application file for complete search history.

(56) References Cited

U.S. PATENT DOCUMENTS

| 4,020,244 | A  | * | 4/1977  | Selinko  | H01M 2/1077 429/100 |
|---|---|---|---|---|---|
| 2003/0027044 | A1 | * | 2/2003  | Asahina  | H01M 2/22 429/179 |
| 2007/0111089 | A1 | * | 5/2007  | Swan     | H01M 2/024 429/160 |
| 2011/0117401 | A1 | * | 5/2011  | Lee      | H01M 2/0245 429/82 |
| 2011/0135992 | A1 |   | 6/2011  | Kim et al. | |
| 2011/0294000 | A1 | * | 12/2011 | Kim      | H01M 2/1077 429/176 |
| 2012/0019061 | A1 | * | 1/2012  | Nishihara | H01M 2/1077 307/10.1 |
| 2012/0040226 | A1 | * | 2/2012  | Kim      | H01M 2/1077 429/120 |
| 2012/0114985 | A1 |   | 5/2012  | Kim et al. | |
| 2012/0115011 | A1 | * | 5/2012  | Kim      | H01M 2/1077 429/156 |
| 2012/0214046 | A1 |   | 8/2012  | Lim      | |
| 2013/0022859 | A1 |   | 1/2013  | Lim      | |

FOREIGN PATENT DOCUMENTS

JP 2012-174693 A 9/2012

OTHER PUBLICATIONS

European Search Report dated Oct. 27, 2014.

* cited by examiner

*Primary Examiner* — Carlos Barcena
(74) *Attorney, Agent, or Firm* — McGinn IP Law Group, PLLC (57) ABSTRACT A battery module includes a cell unit, a first end plate, and a binding band. The cell unit includes a plurality of battery cells arranged in a first direction. The first end plate is located on one side of the cell unit in the first direction. The binding band extends in the first direction and is coupled with the first plate so as to bind the first end plate and the cell unit. The first end plate has an external terminal surface directed to an opposite side with respect to the cell unit in the first direction. An external terminal is connected to the external terminal surface. The binding band is located on a side surface of the cell unit and is coupled with the external terminal surface.

20 Claims, 7 Drawing Sheets

BATTERY MODULE

CROSS-REFERENCE TO RELATED APPLICATIONS

This application claims priority of Japanese Patent Application No. 2013-080631 filed on Apr. 8, 2013, the content of which is incorporated herein by reference.

FIELD

The present invention relates to a battery module.

BACKGROUND

A conventional battery module is disclosed in JP 2012-174693 A. This battery module has a cell unit including a plurality of battery cells arranged in a first direction as well as first and second end plates between which both sides of the cell unit in the first direction is sandwiched.

The first and second end plates and the cell unit are bound by a binding band extending in the first direction. The cell unit has an external terminal surface on which the terminals of the battery cells are located and to which an external terminal is connected.

In the above conventional battery module, the terminals of the battery cells are located on the external terminal surface of the cell unit. Therefore, due to interference with the terminals, the binding band cannot be placed on the external terminal surface. For this reason, when the external terminal is connected to the external terminal surface of the cell unit by means of such as fastening or welding, there arises a problem that the external terminal surface of the cell unit is deformed and that misalignment between the external terminal surface of the cell unit and the external terminal occurs.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a battery module that can prevent deformation of an external terminal surface when an external terminal is connected to an external terminal surface by means such as fastening or welding and thereby can prevent misalignment between the external terminal surface of the cell unit.

One aspect of the present invention provides a battery module comprising a cell unit including a plurality of battery cells arranged in a first direction, a first end plate located on one side of the cell unit in the first direction, and a binding band extending in the first direction and coupled with the first end plate so as to bind the first end plate and the cell unit. The first end plate is provided with an external terminal surface which is directed to an opposite side with respect to the cell unit in the first direction and to which an external terminal is connected. The binding band is located on a side surface of the cell unit and is coupled with the external terminal surface of the first end plate.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

One aspect of the present invention provides a battery module comprising a cell unit including a plurality of battery cells arranged in a first direction, a first end plate located on one side of the cell unit in the first direction, and a binding band extending in the first direction and coupled with the first end plate so as to bind the first end plate and the cell unit. The first end plate is provided with an external terminal surface which is directed to an opposite side with respect to the cell unit in the first direction and to which an external terminal is connected. The binding band is located on a side surface of the cell unit and is coupled with the external terminal surface of the first end plate.

According to the battery module of the present invention, the binding band is located on the side surface of the cell unit and is coupled with the external terminal surface of the first end plate. This allows the external terminal surface of the first end plate to be held with high strength by the binding bands. Accordingly, when the external terminal is connected to the first end plate by means such as fastening or welding, deformation of the external terminal surface of the first end plate can be prevented, and thereby misalignment between the external terminal surface of the first end plate and the external terminal can be reliably prevented.

In a battery module according to an embodiment, the coupled portions of the plurality of the binding bands coupled with the first end plate are located at corners of the first end plate.

According to the battery module of the embodiment, the portions of the plurality of binding bands coupled with the first end plate are located at the corners of the first end plate. This can increase the torsional rigidity of the first end plate, and thereby the misalignment between the external terminal surface of the first end plate and the negative external terminal 6 can be more reliably prevented.

In a battery module of an embodiment, the coupled portion of the binding band coupled with the first end plate is located at a center of a side of the first end plate when viewed from the first direction.

According to the battery module of the embodiment, the binding band is coupled with the center of the bottom surface side of the first end plate, thereby preventing swelling in the center regions of the first and second end plates as well as the cell unit.

In a battery module of an embodiment, the plurality of the side surfaces of the cell unit include a cell terminal surface where the terminals of the battery cells are located. The pluralities of the binding bands are located on all the side surfaces of the cell unit other than the cell terminal surface.

According to the battery module of the embodiment, the plurality of binding bands are located on all the side surfaces of the cell unit 2 other than the cell terminal surface. This allows the first and second end plates as well as the cell unit 2, to be held firmly by the binding bands and the rigidity of the external terminal surface of the first end plate 31 to be increased. Thus, the misalignment between the external terminal surface of the first end plate and the external terminal can be more reliably prevented.

A battery module of an embodiment comprises a second end plate located on the other side of the cell unit in the first direction. The cell terminal surface of the cell unit is provided with safety valves of the battery cells. An exhaust duct covering the safety valves is located on the cell terminal surface of the cell unit and is coupled with the first end plate and the second end plate.

According to the battery module of the embodiment, the exhaust duct is located on the cell terminal surface of the cell unit and is coupled with the first and second end plates. This allows the exhaust duct to bind the first and second end plates and the cell unit 2. Thus, all side surface surfaces around the cell unit can be bound, for example, and the rigidity of the first and second end plates and the cell unit can be increased.

In a battery module of an embodiment, the cell unit has a spacer between the battery cells adjacent to each other. The cell terminal surface of the cell unit is provided with safety valves of the battery cells. An exhaust duct covering the safety valves is located on the cell terminal surface of the cell unit and is coupled with the spacer.

According to the battery module of the embodiment, the exhaust duct is located on the cell terminal surface of the cell unit and is coupled with the spacer. This allows the exhaust duct to bind the cell unit. Thus, for example, this allows the exhaust duct to bind all the side surfaces of the cell unit, thereby increasing the rigidity of the cell unit.

A battery module according to an embodiment comprises a case to accommodate the cell unit and the first end plate. The case has a guide portion. The first end plate has a guided portion that is slidably guided by the guide portion.

According to the battery module of the embodiment, the case has the guide portion and the first end plate has the guided portion. This allows the cell unit to be easily loaded into and unloaded from the case. Further, the cell unit can be held in the case with less dead space (i.e., less clearance that allows movement of the cell unit), and thereby the cell unit cab be stably accommodated in the case.

In a battery module of an embodiment, the guided portion is a band-shaped groove in which the binding band is fitted. The guide portion of the case is slidably fitted in the band-shaped groove.

According to the battery module of the embodiment, the band-shaped groove is slidably fitted in the guide portion of the case. This allows the band-shaped groove in which the binding band is fitted to be used also as a guide groove to receive the cell unit in the case.

A battery module of an embodiment comprises a securing bar to secure the binding bars with each other.

According to the battery module of the embodiment, the binding bands are secured with each other by the securing bar, resulting in that the strength of the first end plate against torsion is increased.

According to the battery module of the present invention, the binding band is located on the side surface of the cell unit and is coupled with the external terminal surface of the first end plate. This can prevent misalignment between the external terminal surface of the first end plate and the external terminal.

Exemplary embodiments of the present invention will be described in detail.

First Embodiment

Figure 1:
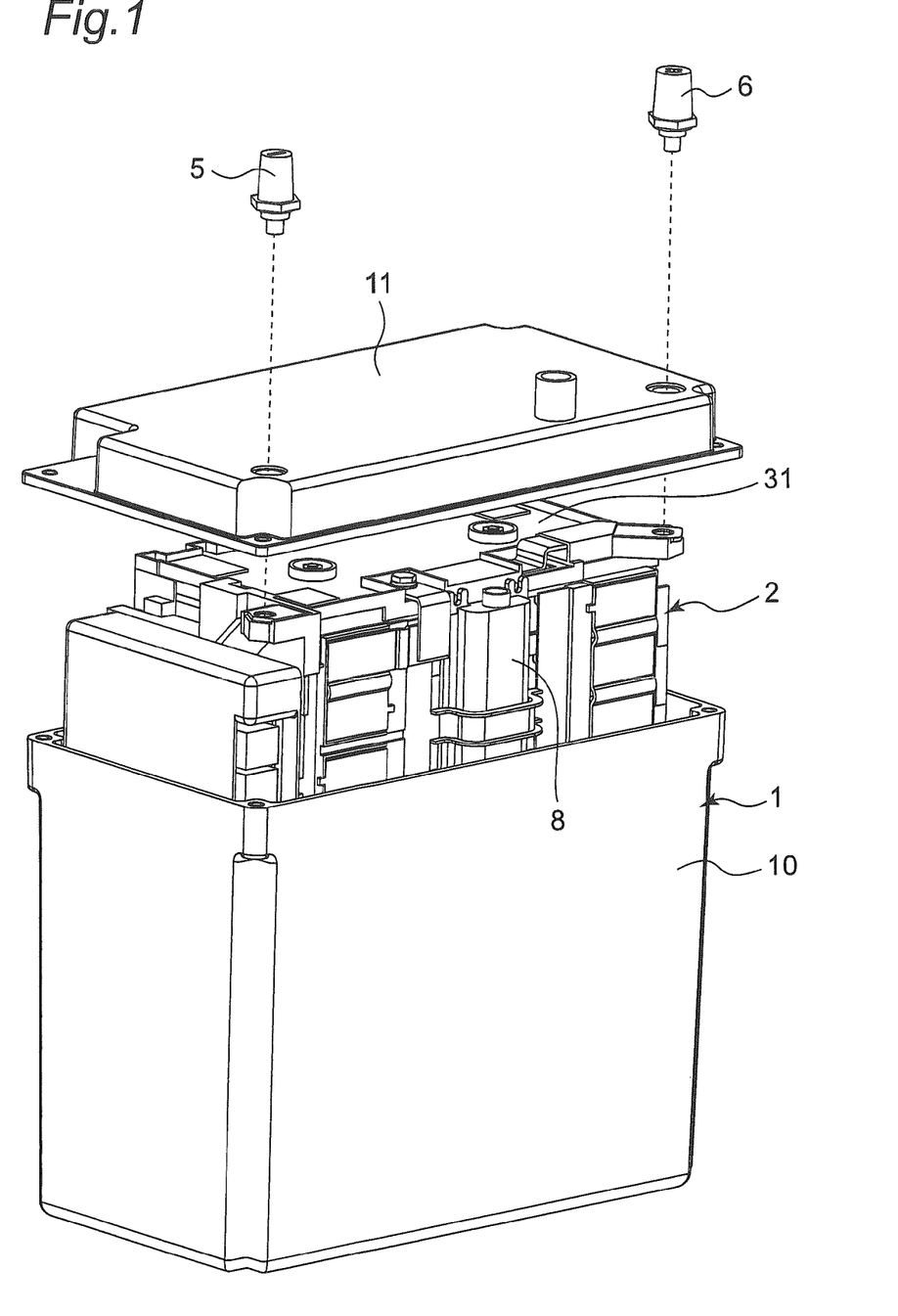
FIG. 1 is a perspective view of a battery module according to a first embodiment of the present invention.

FIG. 1 is a perspective view illustrating a battery module according to a first embodiment of the present invention. As shown in FIG. 1, the battery module includes a case 1 and a cell unit 2 accommodated in the case 1.

The case 1 includes a body 10 having an opening and a cover 11 attached to the body 10 so as to close the opening. Arranged outside of the case 1 are a positive external terminal 5 and a negative external terminal 6. The positive external terminal 5 and the negative external terminal 6 extend through the cover 11 to be electrically connected to the cell unit 2.

Figure 2:
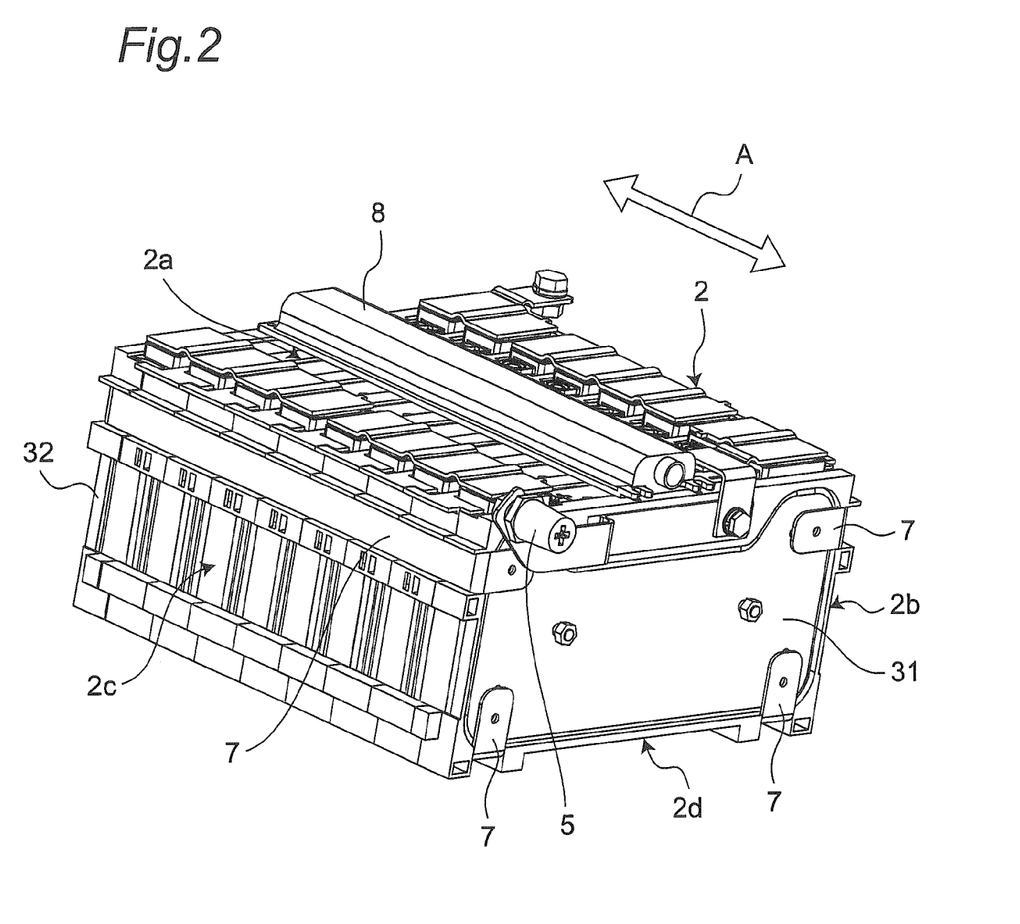
FIG. 2 is a perspective view showing a combined status of a first endplate, a second endplate, and a cell unit.
Figure 3:
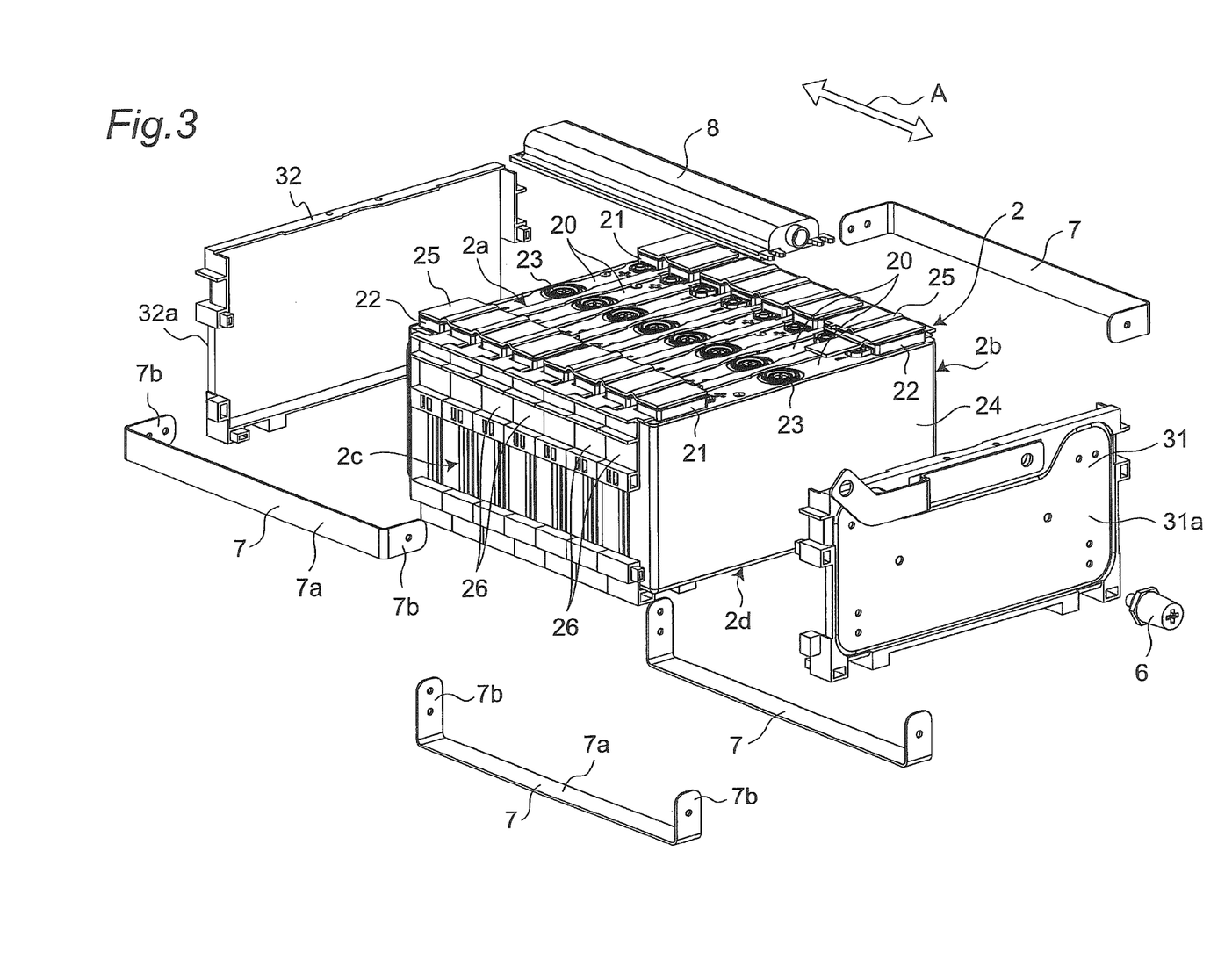
FIG. 3 is an exploded perspective view of the first endplate, the second endplate, and the cell unit.

As shown in FIGS. 2 and 3, the cell unit 2 includes eight battery cells 20 arranged in a first direction (the direction shown by an arrow A). Spacers 26 are respectively interposed between the battery cells 20 adjacent to each other.

The battery cell 20 is, for example, a non-aqueous electrolyte secondary battery. The battery cell 20 includes a sealed vessel 24 and a power generating element accommodated in the sealed vessel 24. The power generating element has a positive electrode plate, a negative electrode plate, and separators interposed between the positive electrode plate and the negative electrode plate. A cover of the sealed vessel 24 is provided with a positive terminal 21 and a negative terminal 22 respectively being exposed to the outside. The positive terminal 21 and the positive electrode plate, as well as the negative terminal 22 and the negative electrode plate, are electrically connected through a current collector 27 disposed in the sealed vessel 24 (see FIG. 4).

The cover of the sealed vessel 24 is provided with a safety valve 23 arranged at a position between the positive terminal 21 and the negative terminal 22. When a pressure of gas generated in the sealed vessel 24 reaches above a predetermined value, the safety valve 23 releases the gas out of the sealed vessel 24. The safety valves 23 of the battery cells 20 are covered by an exhaust duct 8 extending in the first direction.

The first to eighth battery cells 20 are arranged in line from one side in the first direction (front side in the drawing) to the other side in the first direction (rear side in the drawing). The first and second battery cells 20 are placed so that the respective positive terminals 21 are aligned on the left side in the figure. The third and fourth battery cells 20 are placed so that the respective positive terminals 21 are aligned on the right side in the figure. The fifth and sixth battery cells 20 are placed so that the respective positive terminals 21 are aligned on the left side in the figure. Further, the seventh and eighth battery cells 20 are placed so that the respective positive terminals 21 are aligned on the right side in the figure.

A pair of the first and second battery cells 20, a pair of the third and fourth battery cells 20, a pair of the fifth and sixth battery cells 20, and a pair of the seventh and eighth battery cells 20 are respectively electrically connected in series via a bus bars 25. The positive side of the plurality of battery cells 20 connected in series in that way is electrically connected to the positive external terminal 5 via a bus bar, while the negative side of the serially connected plurality of battery cells 20 is electrically connected to the negative external terminal 6 via a bus bar.

The cell unit 2 has four side surfaces around its periphery. The four side surfaces include a cell terminal surface 2a, a right side surface 2b, a left side surface 2c, and a bottom surface 2d. The cell terminal surface 2a and the bottom surface 2d are opposed to each other. The right side surface 2b and the left side surface 2c are opposed to each other. The cell terminal surface 2a is a surface where the terminals 21 and 22 of the battery cells 20 are located.

The one side of the cell unit 2 in the first direction is provided with a first end plate 31. The other side of the cell unit 2 in the first direction is provided with a second end plate 32. The cell unit 2 is sandwiched by the first and second end plates 31 and 32.

The first end plate 31 has an external terminal surface 31a to which the negative external terminal 6 is connected. The external terminal surface 31a is directed to an opposite side with respect to the cell unit 2 in the first direction. The first end plate 31 has a rectangular shape viewed from the first direction. The second end plate 32 has the same shape as that of the first end plate 31.

The first and second end plates 31, 32 and the cell unit 2 are bound together by four binding bands 7. The binding bands 7 extend in the first direction and are coupled with the first and second end plates 31 and 32.

On each of all the side surfaces 2b, 2c, and 2d of the cell unit 2 other than the cell terminal surface 2a, the binding band 7 is located with all of the binding bands 7 being coupled with the external terminal surface 31a of the first end plate 31. Specifically, a single binding band 7 is located on each of the right side surface 2b and the left side surface 2c, and two binding bands 7 are located on the bottom surface 2d. The exhaust duct 8 is located on the cell terminal surface 2a and is coupled with the first and second end plates 31 and 32.

The binding band 7 has a body part 7a extending in the first direction and bent portions 7b respectively connected to one of both ends of the body part 7a. The bent portions 7b are directed to so as to be perpendicular to the body part 7a. The body parts 7a are located on the side surfaces 2b, 2c, and 2d of the cell unit 2. For each of the binding bands 7, one of the bent portions 7b is located on the external terminal surface 31a of the first end plate 31 and the other of the bent portions 7b is located on the end face 32a of the second end plate 32 directed to an opposite side with respect to the cell unit in the first direction.

Figure 4:
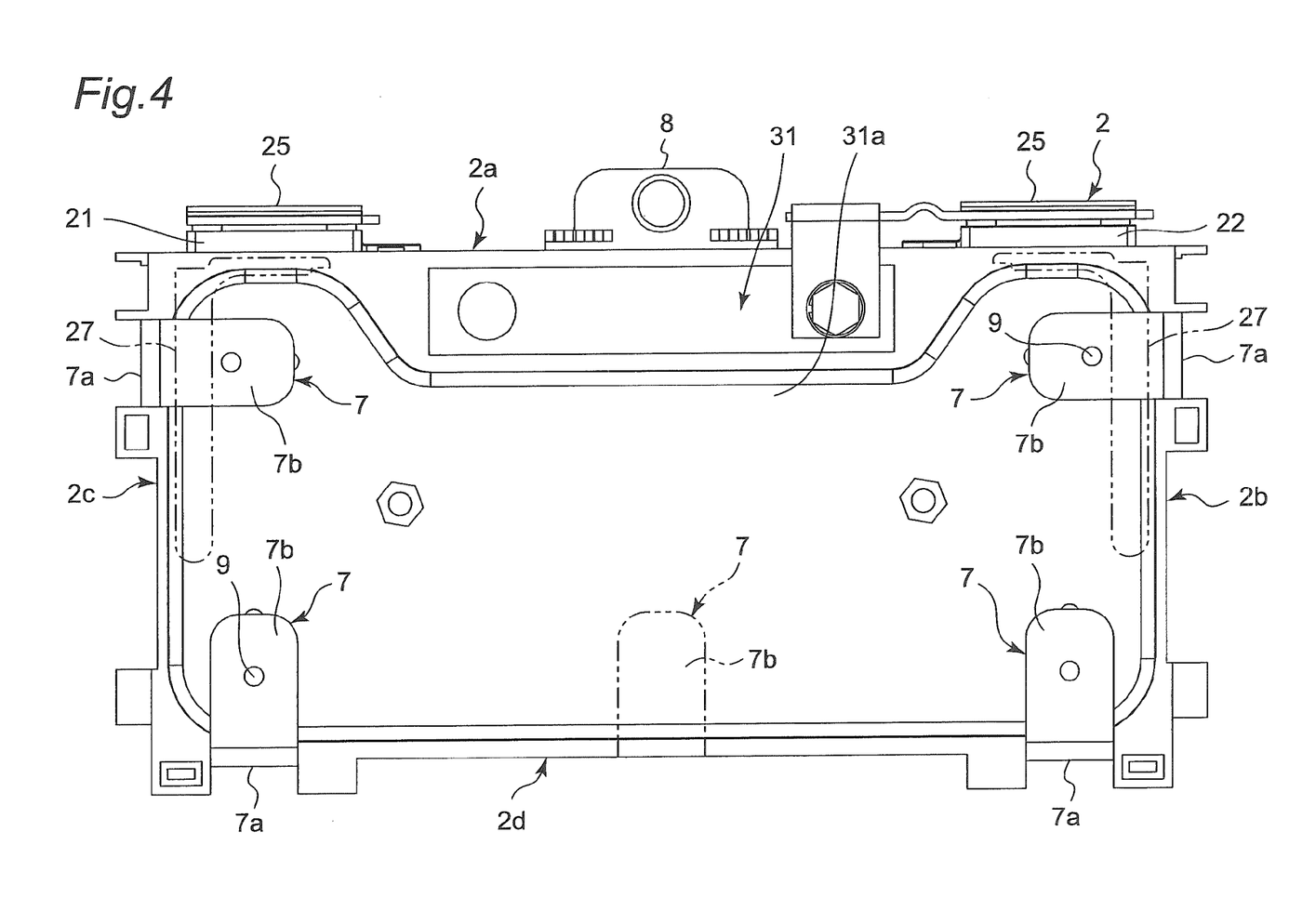
FIG. 4 is a front view showing the first end plate and the cell unit.

As shown in FIG. 4, one of bent portions 7b of the binding band 7 is coupled with the external terminal surface 31a of the first end plate 31. This coupling of the bent portion 7b is achieved, for example, by a blind rivet 9. The use of the blind rivet 9 prevents the blind rivet 9 from projecting outwardly. This allows the blind rivet 9 to reduce space and an external force to be less likely to be applied to the blind rivet 9.

The bent portions 7b of four binding bands 7 are located at the corners of the plate 31 when viewed from the first direction. The bent portions 7b of the binding bands 7 located on the right side surface 2b and the left side surface 2c are located at the corners on the cell terminal surface 2a side (i.e., upper side in the figure). The bent portions 7b of the binding bands 7 located on the bottom surface 2d are located at the corners on the cell terminal surface 2a side (i.e., lower side in the figure).

The phrase "located at the corners" is used herein with respect to the two upper bent portions 7b to mean the positions overlapping with the left and right current collectors 27 (shown in virtual lines in FIG. 4) viewed from the first direction. This configuration keeps the weight balance, improves reliability under vibration, and therefore is effective to the problem of misalignment. Specifically, it is effective that the binding bands 7 support locations of the current collectors 27 which hold the power generating element with heavy weight.

On the other hand, the phrase "located at the corners" is used with respect to the two lower bent portions 7b to mean the positions relative to the two upper bent portions 7b. Such relative positions enable the lower and upper binding bands 7 to maintain the rigidity of the first end plate 31 and enable common part to be used as the upper and lower binding bands 7. The two lower bent portions 7b overlap with the left and right current collectors 27 (shown in virtual lines in FIG. 4) viewed from the cell terminal surface 2a side (i.e., upper side in FIG. 4).

It should be noted that the other bent portions 7b of the binding bands 7 are coupled with the end face 32a of the second end plate 32. The positions of the other bent portions 7b relative to the second end plate 32 are the same as those of the one bent portions 7b relative to the first end plate 31.

Figure 5:
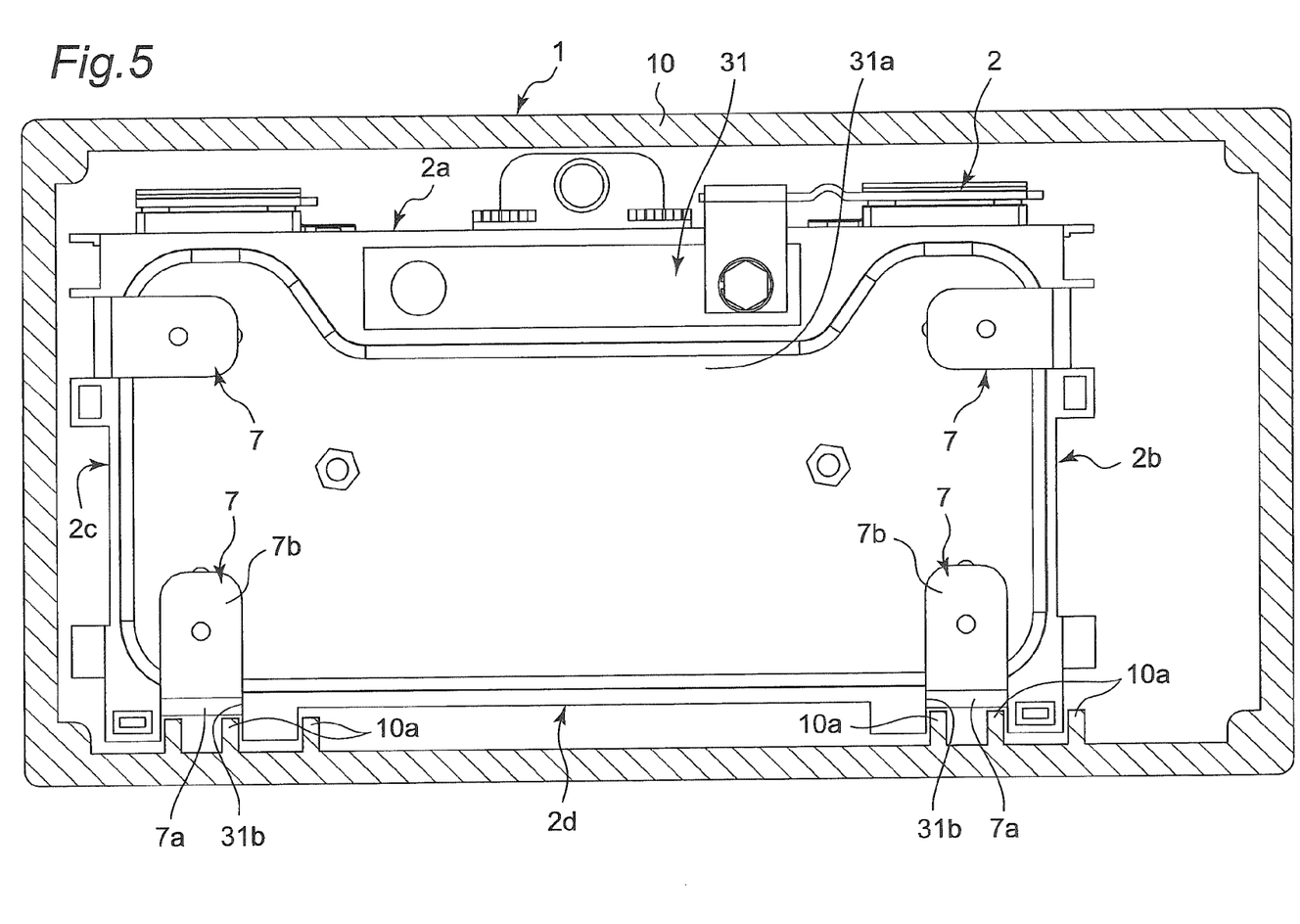
FIG. 5 is a front view showing the first end plate, the cell unit, and a case.

As shown in FIG. 5, the first end plate 31 has band-shaped grooves 31b in which the binding band 7 is fitted. The band-shaped grooves 31b are provided at the left and right corners on the bottom surface 2d side of the cell unit 2.

The inner surface of the body 10 of the case 1 is provided with guide portions 10a. The guide portions 10a are formed on the inner surface of the body 10 which faces the bottom surface 2d of the cell unit 2. The guide portions 10a extend in the direction in which the cell unit 2 is inserted into the case 1.

When the first and second end plates 31 and 32 and the cell unit 2 are accommodated in the case 1, each of the band-shaped grooves 31b is slidably fitted in the guide portion 10a.

According to the above-configured battery module, the binding bands 7 are located on the side surfaces 2b, 2c, and 2d of the cell unit 2 and are coupled with the external terminal surface 31a of the first end plate 31. This allows the external terminal surface 31a of the first end plate 31 to be held with high strength by the binding bands 7. Therefore, when the negative external terminal 6 is connected to the first end plate 31 by means such as fastening or welding, deformation of the external terminal surface 31a of the first end plate 31 can be prevented, and thereby misalignment between the external terminal surface 31a of the first end plate 31 and the negative external terminal 6 can be reliably prevented.

The portions of the plurality of binding bands 7 coupled with the first end plate 31 (bent portions 7b) are located at the corners of the first end plate 31. This can increase the torsional rigidity of the first end plate 31, and thereby the misalignment between the external terminal surface 31a of the first end plate 31 and the negative external terminal 6 can be more reliably prevented. The length of the bent portions 7b also can be shortened, and this increases the bending rigidity of the bent portions 7b.

The plurality of binding bands 7 are located on all the side surfaces 2b, 2c, and 2d of the cell unit 2 other than the cell terminal surface 2a. This allows the first and second end plates 31 and 32, as well as the cell unit 2, to be held firmly by the binding bands 7 and the rigidity of the external terminal surface 31a of the first end plate 31 to be increased. Thus, the misalignment between the external terminal surface 31a of the first end plate 31 and the negative external terminal 6 can be more reliably prevented.

The exhaust duct 8 is located on the cell terminal surface 2a of the cell unit 2 and is coupled with the first and second end plates 31 and 32. This allows the exhaust duct 8 to bind the first and second end plates 31 and 32 and the cell unit 2. Thus, all side surface surfaces 2a, 2b, 2c, and 2d around the cell unit 2 can be bound, for example, and the rigidity of the first and second end plates 31 and 32 and the cell unit 2 can be increased.

The band-shaped groove 31b, in which the binding band 7 is fitted, is slidably fitted in the guide portion 10a of the case 1. This allows the band-shaped groove 31b in which the binding band 7 is fitted to be used also as a guide groove to receive the cell unit 2 in the case 1, and thereby allows the cell unit 2 to be easily loaded into and unloaded from the case 1. Further, the cell unit 2 can be held in the case 1 with less dead space (i.e., less clearance that allows movement of the cell unit 2), and thereby the cell unit 2 can be stably accommodated in the case 1.

As shown by virtual lines in FIG. 4, another binding band 7 may be provided. The coupled portion of such another binding band 7 to be coupled with the first end plate 31 (bent portion 7b) may be located in the center of the bottom side of the first end plate 31 (bottom surface 2d side of the cell unit 2) viewed from the first direction. Thus, the binding band 7 is coupled with the center of the bottom surface side of the first end plate 31, thereby preventing swelling in the center regions of the first and second end plates 31 and 32 as well as the cell unit 2. The center portions of the left and right sides of the first end plate 31 (portions of the cell unit 2 corresponding to left and right side surfaces 2b and 2c) may be coupled with the binding band 7. Instead of the corners of the first end plate 31, the center portions of the sides of the first end plate 31 may be coupled with the binding band 7.

The exhaust duct 8 may be coupled with at least one spacer 26 instead of the first and second end plates 31 and 32. This allows the exhaust duct 8 to bind the cell unit 2. For example, this allows the exhaust duct 8 to bind all the side surfaces 2a, 2b, 2c, and 2d of the cell unit 2, thereby increasing the rigidity of the cell unit 2 and also particularly enhancing vibration resistance of the battery cells 20 adjacent to the spacer 26 coupled to the exhaust duct 8. Further, coupling the spacer 26 as well as the first and second end plates 31 and 32 with the exhaust duct 8 can improve vibration resistance in addition to rigidity.

Although the case 1 is provided with a convex guide portion 10a and the first end plate 31 is provided with a concave band-shaped groove 31b in this embodiment, the case may be provided with a concave guide portion and the first end plate may be provided with a convex guided portion so that the convex guided portion is slidably guided by the concave guide portion.

Second Embodiment

Figure 6A:
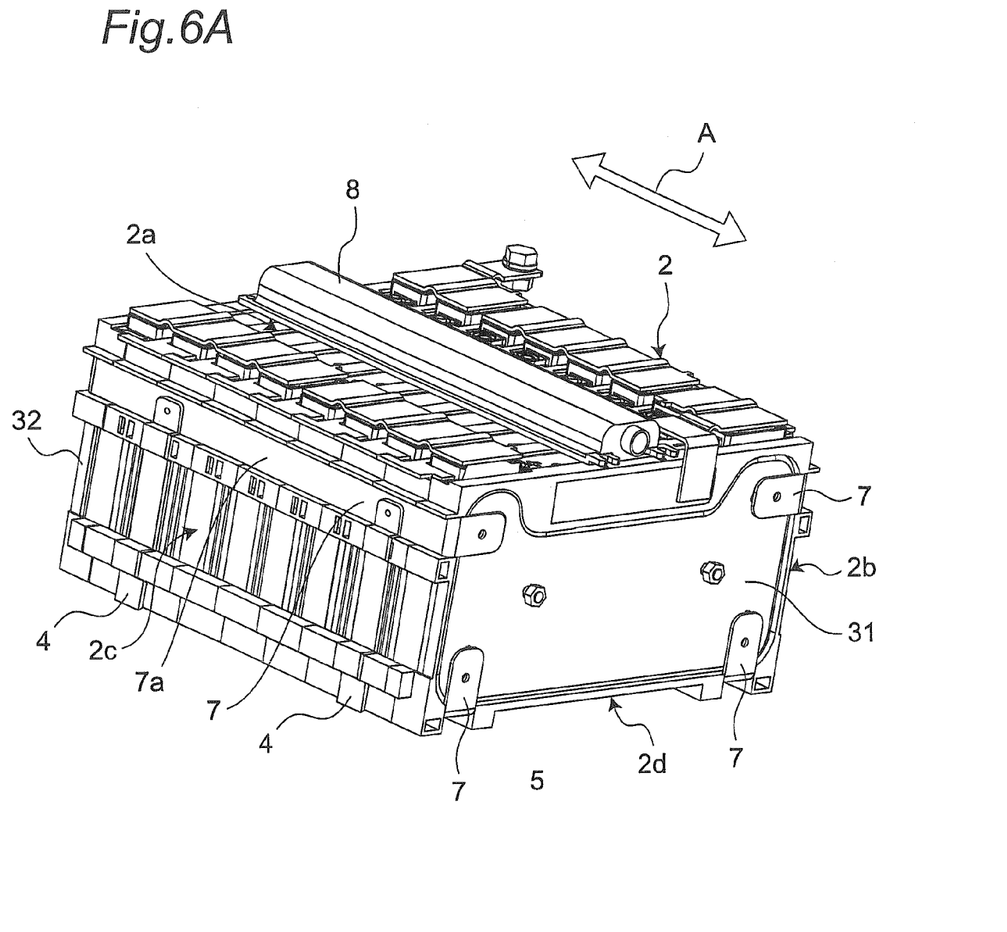
FIG. 6A is a perspective view showing a battery module according to a second embodiment of the present invention.

FIG. 6A is a perspective view illustrating a battery module according to a second embodiment of the present invention. The second embodiment is different from the first embodiment only in the configuration of a securing bar. Only the difference in configuration is described below. In the description of the second embodiment, the reference numerals identical to those of the first embodiment denote the same elements in the first embodiment, and descriptions thereof are omitted.

As illustrated in FIG. 6A, the binding bands 7 are secured with each other by securing bars 4 in the second embodiment. Specifically, the body part 7a of the binding band 7 located on the left side surface 2c and the body part 7a of the left binding band 7 located on the bottom surface 2d are secured with each other by the securing bars 4 which extend along the left side surface 2c and the bottom surface 2d. The body part 7a of the binding band 7 located on the right side surface 2b and the body part 7a of the right binding band 7 located on the bottom surface 2d are secured with each other by the securing bars 4 extending along the right side surface 2b and the bottom surface 2d.

Figure 6B:
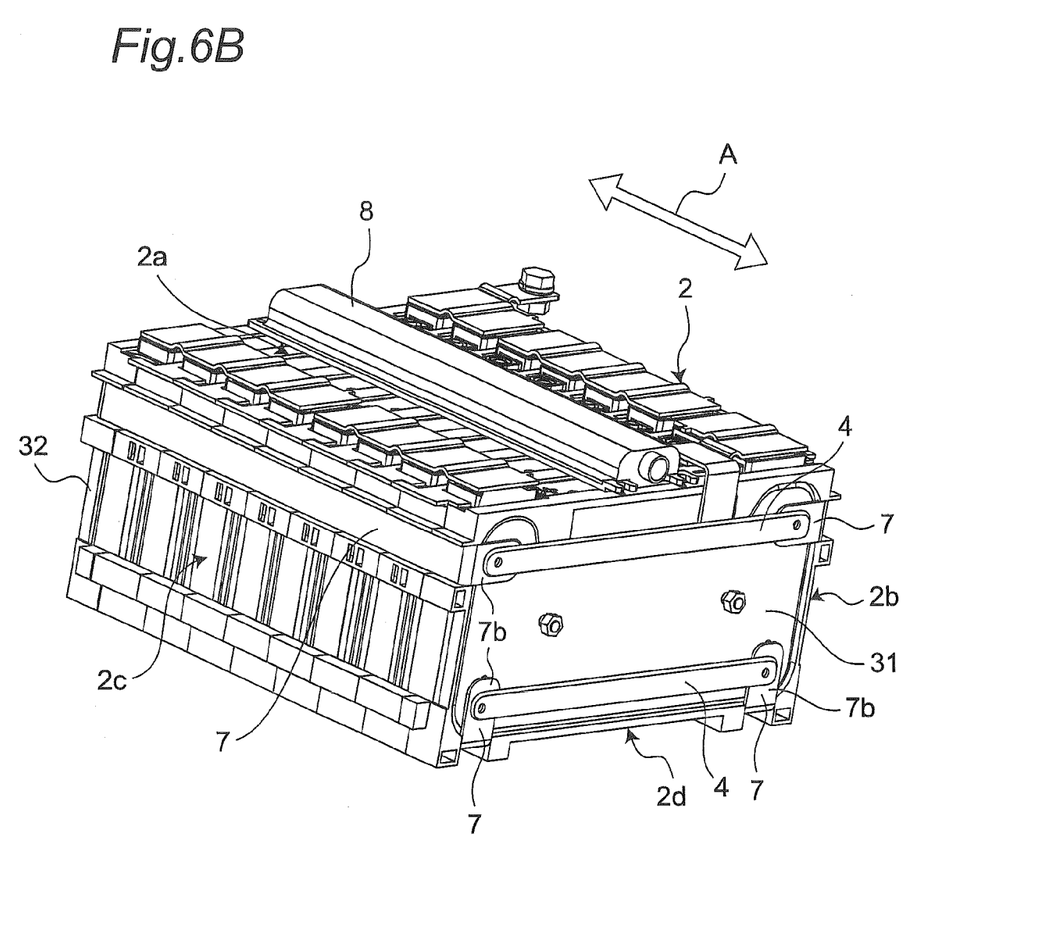
FIG. 6B is a perspective view showing other example of a buttery module.

Alternatively, as illustrated in FIG. 6B, the bent portion 7b of the binding band 7 located on the left side surface 2c and the bent portion 7b of the binding band 7 located on the right side surface 2b may be secured with each other by a securing bar 4 extending along the first end plate 31. The bent portion 7b of the left binding band 7 located on the bottom surface 2d and the bent portion 7b of the right binding band 7 located on the bottom surface 2d may be secured with each other by a securing bar 4 extending along the first end plate 31.

The binding bands 7 are secured with each other by the securing bars 4 as described above, resulting in that the strength of the first end plate 31 against torsion is increased. The number of the securing bars 4 may be increased or decreased as desired, and the securing bars 4 are secured to the binding bands 7 by any method.

The present invention is not limited to the embodiments described above. For example, the number of the battery cells and the number of the binding bands may be increased or decreased as desired. The positive external terminal and the negative external terminal may be inversely arranged.

Although the binding bands are placed on all side surfaces of the cell unit other than the cell terminal surface in the above embodiments, the binding band may be placed on at least one side surface of the cell unit other than the cell terminal surface.

Although the bent portions of the binding bands are placed at four corners of the first end plate in the above embodiments, the bent portion may be at least placed at one corner of the first end plate.

What is claimed is:

1. A battery module comprising:
   a cell unit including a plurality of battery cells arranged in a first direction;
   a first end plate located on one side of the cell unit in the first direction; and
   a binding band extending in the first direction and coupled with the first end plate so as to bind the first end plate and the cell unit,
   wherein the first end plate is provided with an external terminal surface which is directed to an opposite side with respect to the cell unit in the first direction and to which an external terminal is connected, and
   wherein the binding band is located on a side surface of the cell unit and is coupled with the external terminal surface of the first end plate.

2. The battery module according to claim 1, wherein the binding band comprises a plurality of binding bands which include coupled portions coupled with the first end plate at corners of the first end plate.

3. The battery module according to claim 1, wherein a coupled portion of the binding band coupled with the first end plate is located at a center of a side of the first end plate when viewed from the first direction.

4. The battery module according to claim 1, wherein the side surface of the cell unit comprises a first side surface,
   wherein the cell unit comprises a plurality of side surfaces including the first side surface, and a cell terminal surface where the terminals of the battery cells are located, and
   wherein the binding band comprises a plurality of binding bands which are located on all the plurality of side surfaces of the cell unit other than the cell terminal surface.

5. The battery module according to claim 4, further comprising a second end plate located on the other side of the cell unit in the first direction,
wherein the cell terminal surface of the cell unit is provided with safety valves of the battery cells, and
wherein an exhaust duct covering the safety valves is located on the cell terminal surface of the cell unit and is coupled with the first end plate and the second end plate.

6. The battery module according to claim 4, wherein the cell unit has a spacer between the battery cells adjacent to each other,
wherein the cell terminal surface of the cell unit is provided with safety valves of the battery cells, and
wherein an exhaust duct covering the safety valves is located on the cell terminal surface of the cell unit and is coupled with the spacer.

7. The battery module according to claim 1, further comprising a case to accommodate the cell unit and the first end plate,
wherein the case has a guide portion, and
wherein the first end plate has a guided portion that is slidably guided by the guide portion.

8. The battery module according to claim 7, wherein the guided portion comprises a band-shaped groove in which the binding band is fitted, and
wherein the guide portion of the case is slidably fitted in the band-shaped groove.

9. The battery module according to claim 1, wherein the binding band comprises a plurality of binding bands, and
wherein the battery module further comprises a securing bar to secure the plurality of binding bars with each other.

10. The battery module according to claim 1, further comprising:
a resin case comprising a body and a cover formed on an opening of the body, the cell unit being accommodated in the case such that the external terminal surface faces the cover.

11. The battery module according to claim 10, wherein the external terminal extends through an opening in the cover to be electrically connected to the cell unit, and
wherein the external terminal is connected to the external terminal surface by one of fastening and welding.

12. The battery module according to claim 1, further comprising:
a plurality of bus bars which electrically connects the plurality of battery cells in series,
wherein the external terminal comprises a positive external terminal, and a positive side of the plurality of battery cells is electrically connected to the positive external terminal via a bus bar of the plurality of bus bars.

13. The battery module according to claim 1, wherein a battery cell of the plurality of battery cells comprises:
a sealed vessel including a cover;
a power generating element accommodated in the sealed vessel;
positive and negative terminals formed on the cover of the sealed vessel; and
a pair of current collectors which electrically connect the positive and negative terminals to the power generating element, respectively.

14. The battery module according to claim 13, further comprising:
a safety valve formed in the cover of the sealed vessel between the positive and negative terminals; and
an exhaust duct formed over the safety valve and extending in the first direction.

15. The battery module according to claim 13, further comprising:
a second end plate which is formed on a side of the cell unit which is opposite the first end plate,
wherein the binding band comprises:
a body part extending in the first direction;
a first bent portion which projects perpendicularly from a first end of the body part and is connected to the first end plate; and
a second bent portion which projects perpendicularly from a second end of the body part opposite the first end, and is connected to the second end plate.

16. The battery module according to claim 15, wherein the first and second bent portions overlap with the pair of current collectors, respectively, when viewed from the first direction.

17. The battery module according to claim 13, wherein the side surface of the cell unit comprises a first side surface, and
wherein the cell unit further comprises:
a second side surface formed opposite the first side surface;
a cell terminal surface on which the positive and negative terminals of the battery cell are formed, and which connects the first and second side surfaces; and
a bottom surface which is formed opposite the cell terminal surface.

18. The battery module according to claim 17, wherein the binding band comprises a first binding band formed on the first side surface of the cell unit, and
wherein the battery module further comprises:
a second binding band formed on the second side surface of the cell unit; and
third and fourth binding bands formed on the bottom surface of the cell unit.

19. A battery module comprising:
a cell unit including a plurality of battery cells arranged in a first direction;
a first end plate located on a side of the cell unit in the first direction, and comprising an external terminal surface which is formed opposite the cell unit in the first direction;
an external terminal which is connected to the external terminal surface; and
a binding band extending in the first direction and coupled with the first end plate so as to bind the first end plate and the cell unit, the binding band being located on a side surface of the cell unit and being coupled with the external terminal surface of the first end plate.

20. A battery module comprising:
a cell unit including a plurality of battery cells which are arranged in a first direction and comprise positive and negative terminals, the cell unit comprising a plurality of surfaces including:
a first side surface;
a second side surface formed opposite the first side surface;
a cell terminal surface on which the positive and negative terminals of the plurality of battery cells are formed, and which connects the first and second side surfaces; and
a bottom surface which is formed opposite the cell terminal surface;
a first end plate located on a side of the cell unit in the first direction, and including an external terminal surface which is opposite the cell unit in the first direction and to which an external terminal is connected;

a second end plate formed on a side of the cell unit which is opposite the first end plate, and including an end surface which is opposite the cell unit in the first direction; and a plurality of binding bands which are formed on the plurality of surfaces of the cell unit except for the cell terminal surface, a binding band of the plurality of binding bands comprising:

a body part extending in the first direction;

a first bent portion which projects perpendicularly from a first end of the body part and is connected to the external terminal surface of the first end plate; and a second bent portion which projects perpendicularly from a second end of the body part opposite the first end, and is connected to the end surface of the second end plate.

* * * * *